United States Patent [19]

Koike et al.

[11] Patent Number: 5,253,323
[45] Date of Patent: Oct. 12, 1993

[54] METHOD OF MANUFACTURING A GRADED OPTICAL TRANSMISSION MEDIUM MADE OF SYNTHETIC RESIN

[75] Inventors: Yasuhiro Koike, Meguro; Eisuke Nihei, Kawasaki, both of Japan

[73] Assignees: Yasuhiro Koike; Nippon Petrochemicals Company, Limited, Tokyo, Japan

[21] Appl. No.: 847,031
[22] PCT Filed: Aug. 16, 1991
[86] PCT No.: PCT/JP91/01092
§ 371 Date: Apr. 15, 1992
§ 102(e) Date: Apr. 15, 1992
[87] PCT Pub. No.: WO92/03750
PCT Pub. Date: Mar. 5, 1992

[30] Foreign Application Priority Data

Aug. 16, 1990 [JP] Japan .................. 2-216359

[51] Int. Cl.⁵ .............................................. G02B 6/18
[52] U.S. Cl. .................................. 385/143; 385/124; 385/145; 359/652; 359/653; 359/654; 264/1.5
[58] Field of Search ............... 385/124, 129, 141, 142, 385/143, 144, 145, 146; 359/652, 653, 654, 655; 264/1.4, 1.5, 1.6, 2.6, 4.7, 165; 427/162, 163

[56] References Cited

U.S. PATENT DOCUMENTS

| | | | |
|---|---|---|---|
| 3,955,015 | 5/1976 | Ohtsuka et al. | 427/163 |
| 3,999,834 | 12/1976 | Ohtomo et al. | 385/141 X |
| 4,842,783 | 6/1989 | Blaylock | 264/1.4 |
| 5,037,615 | 8/1991 | Kane | 422/82.08 |

FOREIGN PATENT DOCUMENTS 52-5857 2/1977 Japan.
54-30301 9/1979 Japan.
61-130904 6/1986 Japan.

*Primary Examiner*—Frank Gonzalez
*Attorney, Agent, or Firm*—Scully, Scott, Murphy & Presser

[57] ABSTRACT

A method of manufacturing a multimode optical transmission medium from a synthetic resin having the distribution of refractive index varying continuously in a fixed direction. In the method, the polymerization is caused to proceed utilizing the effect of diffusion or exclusion of a monomer in the gel formed at the polymerization initiating terminal. Therefore, this method is free from the defects of methods using conventional polymerization reactions, and has an extremely high productivity.

5 Claims, 1 Drawing Sheet

RATIO OF DISTANCE FROM CENTER

RATIO OF DISTANCE FROM CENTER

METHOD OF MANUFACTURING A GRADED OPTICAL TRANSMISSION MEDIUM MADE OF SYNTHETIC RESIN

DESCRIPTION

TECHNICAL FIELD

This invention relates to a method of manufacturing a multimode optical transmission medium made of synthetic resin, which transmission medium has the optional distribution of refractive index varying continuously in a fixed direction. More particularly, the invention relates to a method of manufacturing a multimode optical transmission medium having the distribution of refractive index varying continuously in a fixed direction, such as optical lenses and optical fibers, in which the polymerization is caused to proceed utilizing the effect of diffusion or exclusion of a monomer in the gel formed at the polymerization initiating terminal.

Background Art

As the modes of optical transmission with optical transmission media such as lenses and fibers, there are two types of single mode type and multimode type.

Among multimode type ones, the graded index type optical transmission media having the distribution of refractive index varying continuously in a fixed direction, are widely used as bar lenses having the function of convex lens, those having the function of concave lenses and broad band optical transmission fibers. Among them, the optical transmission media made of transparent synthetic resins are more widely used in recent years because they have several advantages in view of lightness in weight, economy, easy handling, high impact resistance and flexibility as compared with those made of quartz.

Concerning the method of producing optical transmission media of refractive index distribution type which are made of synthetic resins in specific reaction vessels, there are proposed the following methods in the conventional art.

In Japanese Patent Publication No. 52-5857 (U.S. Pat. No. 3,955,015), a monomer to form a polymer of a different refractive index is subjected to diffusional transfer into a specific transparent solid substance in a polymerization process having a previously formed three-dimensional network structure. After that, the whole polymerization reaction is stopped to obtain an optical transmission medium of refractive index distribution type.

In this method, however, it is necessary that the transparent solid substance is previously made into three-dimensional network structure using a multifunctional radical polymerizable monomer, in order to maintain the configuration of the transparent solid substance. For this reason, it must previously be made separately, which costs much labor. In addition, the obtained polymer of three-dimensional network structure is not good in thermoplasticity and it is not suitable for drawing and other post-forming processes. In other words, the plastics-made optical transmission fibers should have stiffness and tensile strength as fiber materials in the drawing step of manufacturing process. However, the optical transmission medium prepared through the above process has inherently three-dimensional network structure, so that it is not suitable for drawing.

In Japanese Patent Publication No. 54-30301 and Japanese Laid-Open Patent Publication No. 61-130904 are proposed methods for producing optical transmission media having refractive index gradients paying attention to the difference between the monomer reactivity ratios: $r_1$ and $r_2$ of two kinds of monomers.

In the above methods utilizing the difference between the monomer reactivity ratios of monomers, it is desirable that the difference between the radical copolymerization reactivity ratios of $r_1$ and $r_2$ is large, as a result, the formation of homopolymer occurs at first and macromolecules of homopolymer are formed with causing phase separation, which sometimes makes the obtained optical transmission medium clouded to reduce the optical transmission efficiency.

When too large monomer reactivity ratios are selected, one of monomers must be the one having a low rate of polymerization such as vinyl benzoate and vinyl o-chlorobenzoate used in the example of Japanese Patent Publication No. 54-30301, and vinyl phenylacetate used in the example of Japanese Laid-Open Patent Publication No. 61-130904. The use of monomers whose monomer reactivity ratios are largely different means that monomers of considerably low reactivity are used in copolymerization. As a result, the monomer having high reactivity is firstly polymerized and the monomer having low reactivity remains in a high concentration in the final stage of polymerization. Thus, it takes much time to complete the polymerization and, in an extreme case, the removal of remaining monomer is required.

In addition, the existence of residual monomer causes several undesirable influences on mechanical characteristics of transmission media such as tensile strength, elongation and stiffness, and the long term stability of transmission media owing to the postpolymerization or decomposition of residual monomer.

The present inventors have carried out extensive investigations concerning the process to form copolymer resins by radical reaction. When the viscosity of monomer liquid rises and the liquid turns into gel with the progress of the polymerization of monomers, the growing polymer radical is hardly diffused in the gel because the molecular weight of the polymer radical is large. In this case, the termination reaction between two molecules of growing polymer radicals hardly proceeds, as a result, the rate of polymerization increases. In this state, in order to propagate the growing polymer radical further by polymerization, it is necessary that the starting monomer is diffused in the gel and the growing polymer radical is continuously supplied with the starting monomer.

The above phenomenon is accepted as the so-called gel effect in the radical polymerization. When radical polymerization is carried out so that the gel effect is produced from any terminal point of a reaction liquid in the reaction vessel, the polymerization proceeds in a certain direction from an optional point step by step and finally the progress of the polymerization reaches the other end portion.

The inventors of the present application have made further investigations concerning the process of connecting, for example, two kinds of different monomers to propagating polymer radicals in gel. That is, when a monomer becomes gel, the fractionation in a sort is caused to occur between unreacted monomers in the gel, and one of the monomers is selectively diffused into the gel. When monomer is supplied into the gel from the liquid mixture, and diffused and it reaches the propagating terminal of the polymer radical, if the rates of movement of two kinds of monomers are different in gel, only one of monomers reaches the propagating terminal of polymer radical, as a result, the monomer having larger rate of movement is selectively connected to the propagating terminal.

As a consequence, the ratio of the unreacted monomer concentration in the gel to the monomer concentration in the liquid mixture is different from one another in a plurality of monomers. It is apparent that such a difference is not owing to the monomer reactivity ratios.

In view of the above-described facts, the inventors of the present application have accomplished a method of manufacturing an optical transmission medium made of a synthetic resin with a novel method of copolymerization.

The present invention can eliminate several disadvantages in the methods of manufacturing optical transmission media of refractive index distribution type by the conventional polymerization process, and with utilizing the novel findings on the states of polymerization, the present invention attains the object to provide a method of manufacturing a multimode optical transmission medium having excellent characteristics and continuous distribution of refractive index with high productivity.

BRIEF DESCRIPTION OF DRAWINGS

Each of FIG. 1

DISCLOSURE OF INVENTION

Figure 1:
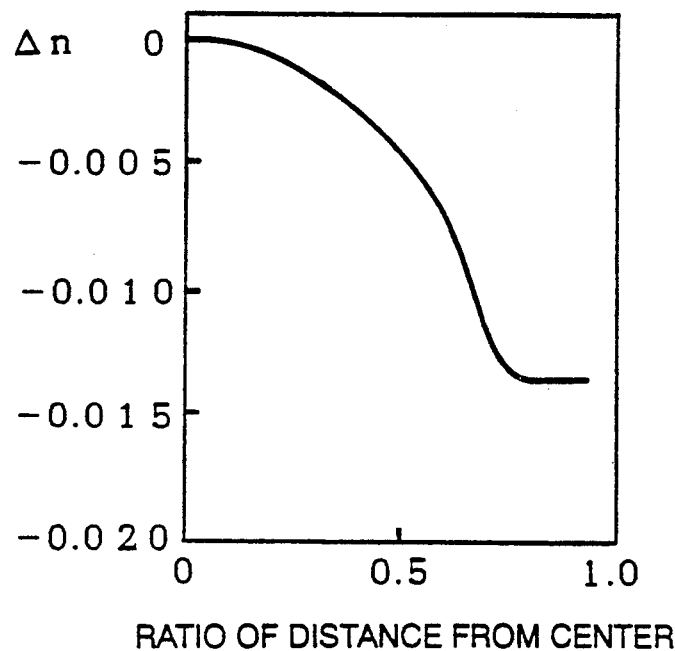

The present invention relates to a method of manufacturing a plastics-made graded index type optical transmission medium having the distribution of refractive index varying continuously in the direction of the progress of polymerization, which is attained by lowering the ratio of monomer having a higher ratio of the unreacted monomer concentration in the gel to the monomer concentration in the liquid mixture, gradually in the direction of the progress of polymerization, and characterized in the use of monomers in which the ratio of unreacted monomer concentration in the gel to the monomer concentration in the liquid mixture of one monomer is different from those of other monomers and the difference in refractive indexes of homopolymers of the monomers is at least 0.005, in the radical polymerization from an optional position in a vessel containing a liquid mixture of a plurality of radical copolymerizable monomers to polymerize the monomers through gel condition into a polymer.

A second characteristic point according to the present invention is that the monomer reactivity ratios of any of the foregoing radical copolymerizable monomers are not less than 0.2, preferably more than 0.5.

A third characteristic point according to the present invention is that the polymerization is caused to proceed from the wall surface of a reaction vessel to the inner part of the vessel.

The present invention will be described in more detail.

In the present invention, a liquid mixture of a plurality of monomers is fed into a vessel, which vessel may be in any configuration such as column, square plate or sphere, preferably column, and more preferably cylinder. The radical copolymerization is then caused to proceed from any terminal portion such as a part of wall surface of the vessel to other part such as an inner part of the vessel under the gel effect. The sizes of the vessel are not limited, that is, a vessel of optional sizes can be employed. For example, when the vessel is a cylindrical one, its inner diameter is suitably from 1 to 70 mm.

In the polymerization, it is possible to use a solvent. In the case that a solvent is used, the removal of the solvent is necessary after the polymerization and there occurs some ill effect in the removal of the solvent, therefore, it is generally advisable that the polymerization is done using the monomer itself as a solvent without using any other solvent.

In the first place, energy to produce radicals such as heat or ultraviolet rays is locally applied from the side of vessel wall by an appropriate known means so as to produce a portion of high temperature or a portion of intense ultraviolet rays in the monomer liquid mixture near the vessel wall, thereby forming radicals of high concentration in such portions and the polymerization is caused to proceed preferentially. It is possible in the case of a cylindrical or a spherical vessel having a rotary axis that the vessel is rotated on the axis at 1000 rpm or less. However, mechanical movement such as rotation, stirring or vibration to destroy or disturb the gel condition is not desirable.

The wavelength and the temperature of heating for the radical polymerization can be optionally selected in accordance with the kinds of monomers. For example, the heating temperature is in the range of room temperature to 150° C. In any case, a radical polymerization initiator such as benzoyl peroxide (BPO) or a photopolymerization sensitizer can be used as occasion demands. Both the photopolymerization and the thermal polymerization can be caused to occur simultaneously.

When the radical polymerization proceeds to increase the viscosity of monomer liquid mixture into a gel condition, the polymer radical is hardly diffused in the gel and the probability to terminate the reaction in the polymerization is low. As a result, the rate of polymerization in the gel portion is raised. The radical propagation terminals in the gel further connect with unreacted monomers to proceed the polymerization and a resin is finally produced. At the same time, the gel is polymerized successively in the direction of polymerization of the front face of polymerized resin. It is, thus, possible to forward successively the polymerization in the direction from the wall of the vessel to the inside of the vessel with utilizing the gel effect. The polymerization initiating terminal may be selected optionally from any point such as the inside wall of a vessel and an inner part of a vessel. The polymerization is started generally from a wall surface of a vessel because heat or light rays can be readily applied.

The term "gel" herein referred to means an oligomer or polymer in which the viscosity is raised to such a degree that the polymer propagating radical cannot substantially be diffused. The oligomer or polymer may be composed of any one of the monomers in the monomer mixture or may be composed of a plurality of monomers. In some cases, the produced gel is separated out from the monomer mixture. However, the polymer in which the polymerization degree is so high that the migration of monomer is impossible in the produced gel, is not included. By the way, too large a rate of polymerization is not desirable because the polymerization is completed without forming a distinct gel condition. In view of this, the rate of polymerization may be determined properly so that the monomer can be sufficiently migrated in the gel. The time of polymerization is generally selected from the range of 1 to 100 hours.

Sufficient gel effect can be produced by setting the gel on the inside wall of a vessel in the beginning of the polymerization initiation step. For this purpose, it is desirable that a vessel made of a material which has large affinity with the monomer to be polymerized. For example, the desirably used vessel is made of a polymer which is made from the same monomer as the used monomer that is more diffusive into the gel or which is made from a monomer having large affinity with such a monomer.

In the present invention, the monomer in which the ratio of the unreacted monomer concentration in the gel to the monomer concentration in the liquid mixture is substantially different, must be used. This unreacted monomer concentration in the gel means the concentration of monomer in the unreacted monomer mixture which remains near the polymer propagation terminal in the gel. Furthermore, the monomer concentration in the liquid mixture means the concentration of monomer in the monomer liquid mixture in contact with the above gel.

Provided that the unreacted monomer concentrations in a gel and the monomer concentrations in the liquid mixture are $M_1{}^g$, $M_2{}^g$, $M_1{}^l$, $M_2{}^l$ in the case of two kinds of monomers $M_1$ and $M_2$, the definition that the ratios of unreacted monomer concentration in the gel to the monomer concentration in the liquid mixture are different, means the relationship represented by the following equation:

$$\frac{M_1{}^g}{M_1{}^l} \neq \frac{M_2{}^g}{M_2{}^l}$$

In the mixture of monomers in which the above ratios of concentration are the same, the ratio of monomer composition in the gel is the same as the ratio of monomer composition in the liquid mixture. In the system like this, the ratio of monomer composition contained in the polymer to be produced, is determined only by the ratio of reactivities of monomers, which is not desirable because the foregoing defects are caused to occur. In other words, the monomer having higher reactivity is firstly polymerized and the monomer having lower reactivity remains in a high concentration in the final stage of polymerization. It is not desirable because it takes much time to complete the polymerization owing to the polymerization of the remaining monomer and, in addition, in an extreme case, the remaining monomer must be removed.

In the present invention as described in the foregoing passage, fractionation effect is caused to occur in the unreacted monomer existing in the gel by the formation of gel, as a result, partiality of specific monomer is caused to occur. Monomers move from the monomer mixture to the inner part of the gel, however, the velocities are different among monomers. As a result, the ratio of monomer composition in the monomer mixture is different from the ratio of monomer (unreacted) composition in the gel.

Although the polymer propagation radical is not diffusive substantially in the gel which is formed in the polymerization, it is necessary that all the above monomers have sufficient diffusion velocity. This is for the reason that, if a monomer is not fed from the monomer mixture which is in contact with gel to the propagation terminal of polymer radical, the polymerization cannot proceed.

The monomers used in the present invention are those in which the foregoing ratios of the unreacted monomer concentration in gel to the monomer concentration in liquid mixture are substantially different from one another. In addition, it is necessary that the refractive indexes of the homopolymers, which are previously determined after polymerizing separately, are different. In other words, the difference in the refractive indexes of homopolymers of monomers is at least 0.005. By using the above monomers, in the ratio of monomer composition in the polymer to be obtained, the content of monomer is decreased in the direction of the progress of polymerization, which monomer is higher in the ratio of the unreacted monomer concentration in gel to the monomer concentration in liquid mixture, thereby obtaining a synthetic resin optical transmission medium having the refractive index gradation in the direction of the progress of polymerization. When monomer mixture in which the difference of refractive indexes of homopolymers is smaller than 0.005 is used, the gradation in refractive index cannot be attained even if the ratio of monomer composition of the obtained polymer is gradient.

The monomer according to the present invention can be determined by measuring the unreacted monomer concentration in gel and the monomer concentration in liquid mixture by an optional method. The measurement of monomer concentration in gel is, however, practically difficult. Accordingly, in order to facilitate the selection of monomers in practice, it is desirable to use the following standards of intrinsic volumes of monomers or solubility parameters of monomers.

(1) Intrinsic Volumes of Monomers

The movement of monomers in gel relates to the intrinsic volumes of monomer. Provided that the intrinsic volumes of two kinds of monomers $M_1$ and $M_2$ in a monomer mixture are $V_1$ and $V_2$, respectively, two kinds of monomers which meet the following equation (1) are selected.

$$\left| \frac{V_1 - V_2}{V_1} \right| > 0.01 \tag{1}$$

The intrinsic volume of monomers can be calculated with the van der Waals radii and inter-atomic distances [e.g., method of G. L. Slonimskii et al. (cf: Vysokomol. soyed. A12: No. 3, 494–512, 1970)].

(2) Solubility Parameters of Monomers

The solubility parameter of monomer also relates to the moving velocity in gel. Accordingly, provided that the solubility parameters of two kinds of monomers $M_1$ and $M_2$ in a monomer mixture are $\delta_1$ and $\delta_2$, respectively, and the solubility parameter of polymer forming a gel is $\delta_p$, two kinds of monomers which meet the following equation (2) are selected.

$$\frac{|\delta_1 - \delta_2|}{\delta_p} \times 100 > 2 \tag{2}$$

In the above equation, the solubility parameters of monomers and polymer can be calculated by the following equation [cf: Method of Hoy et al. (POLYMER HANDBOOK, Third edition, VII/519, published by Wiley Interscience)].

$$\delta = \frac{d \Sigma G}{M}$$

In the above equation, d and M are respectively density and molecular weight of monomer or polymer. G is Group Molar Attraction Constant.

Any of the combination of monomers which does not meet the above equations (1) or (2) is not desirable for the above-described reason because the ratios of the monomer concentration in gel to the monomer concentration in liquid mixture substantially coincide with each other.

For reference purpose, monomer intrinsic volumes and solubility parameters of some radical polymerizable monomers are shown in the following Table 1.

TABLE 1

| Monomer | Intrinsic Volume of Monomer ($Å^3$) | Refractive Index of Polymer | Molecular Weight of Monomer | Solubility Parameter $(cal/cm^3)^{1/2}$ | |
|---|---|---|---|---|---|
| | | | | Polymer | Monomer |
| 4-Methylcyclohexyl-methacrylate | 185.0 | 1.4975 | 182.3 | 9.16 | — |
| Cyclohexyl-methacrylate | 177.6 | 1.5066 | 168.2 | 9.04 | 8.25 |
| Furfurylmethacrylate | 159.6 | 1.5381 | 166.2 | 9.93 | — |
| 1-Phenylethyl-methacrylate | 197.0 | 1.5487 | 190.2 | 9.29 | 8.52 |
| 1-Phenylcyclohexyl-methacrylate | 263.0 | 1.5645 | 244.3 | 8.91 | — |
| Benzylmethacrylate | 180.0 | 1.5680 | 176.2 | 9.54 | 8.87 |
| 1,2-Diphenylethyl-methacrylate | 272.8 | 1.5816 | 266.3 | 9.49 | — |
| o-Chlorobenzyl-methacrylate | 194.7 | 1.5823 | 210.6 | 9.71 | — |
| p-Chlorobenzyl-methacrylate | 194.7 | 1.5823 | 210.6 | 9.71 | 9.21 |
| Diphenylmethyl-methacrylate | 255.7 | 1.5933 | 252.3 | 9.54 | — |
| Pentachlorophenyl-methacrylate | 236.6 | 1.608 | 344.4 | 10.40 | — |
| Pentabromophenyl-methacrylate | 270.5 | 1.71 | 556.7 | 10.02 | — |
| Methylmethacrylate | 104.4 | 1.492 | 100.1 | 9.20 | 7.82 |
| Styrene | 117.8 | 1.591 | 104.0 | 9.28 | 8.15 |
| Phenylmethacrylate | 163.0 | 1.5706 | 162.2 | 9.65 | 9.13 |

The radical polymerizable monomers used in the present invention are monofunctional monomers having one functional group which is active in radical polymerization such as the double bond of allyl group, vinyl group, acrylic group, and methacrylic group. The polyfunctional monomers which form three-dimensional network polymer are not included. However, a small quantity of these polyfunctional monomers can be added without departing from the scope of the present invention.

Furthermore, it is defined as desirable conditions in the present invention that the ratio r of monomer reactivity ratio is not smaller than 0.2 and preferably more than 0.5. The monomer reactivity ratios $r_1$ and $r_1$ are respectively the ratios of coefficients of polymerization rate $k_{11}/k_{12}$ and $k_{22}/k_{21}$ in copolymerization of two kinds of monomers ($M_1$ and $M_2$) which are represented by the following equations.

$M_1\cdot + M_1 \rightarrow M_1\cdot$    Reaction Rate: $k_{11}[M_1\cdot][M_1]$
$M_1\cdot + M_2 \rightarrow M_2\cdot$    Reaction Rate: $k_{12}[M_1\cdot][M_2]$
$M_2\cdot + M_1 \rightarrow M_1\cdot$    Reaction Rate: $k_{21}[M_2\cdot][M_1]$ -continued
$M_2\cdot + M_2 \rightarrow M_2\cdot$    Reaction Rate: $k_{22}[M_2\cdot][M_2]$ In the above equations, the symbols [$M_1\cdot$], [$M_2\cdot$], [$M_1$] and [$M_2$] indicate respectively the concentrations of polymer propagation radical $M_1\cdot$, polymer propagation radical $M_2\cdot$, monomer $M_1$ and monomer $M_2$.

In the case of two kinds of monomers, the monomer reactivity ratios are two of $r_1$ and $r_2$. When 3 kinds of monomers are used, the ratios increase to 6 kinds. Also in the case of 3 kinds of monomers, the 6 reactivity ratios are all not less than 0.2, preferably more than 0.5.

Even in the case of monomers which are substantially different in the ratios of unreacted monomer concentration in gel to monomer concentration in liquid mixture, if the monomer reactivity ratios do not come within the above range, the monomers are hardly copolymerized to each other, so that a more reactive monomer is firstly polymerized and the monomer composition ratio in the polymer is biased to one monomer. In an extreme case, the transparent polymer becomes cloudy by the formation of homopolymer, or less polymerizable monomer remains unreacted in the final stage of the polymerization.

The monomers used in the present invention is required only to meet the above conditions and there is no other limitation. It is possible to select optionally two or more of monomers from those listed in the foregoing Table 1. Among them, the combination of benzylmethacrylate and methylmethacrylate is especially desirable because the monomers are readily available and in view of the transparency of obtained optical transmission media and the good drawing property of obtained polymer.

As described in the following examples, when a liquid mixture of benzylmethacrylate and methylmethacrylate is polymerized from the wall portion of a cylindrical vessel, benzylmethacrylate is densely distributed in the middle portion and methylmethacrylate is distributed near the inside wall surface in the obtained resin. That is, a convex type optical transmission medium in which the refractive index in the central portion is higher than that of the inside wall portion.

However, because the monomer reactivity ratios of methylmethacrylate and benzylmethacrylate are 0.93 and 1.05, respectively, according to the description in Japanese Patent Publication No. 54-30301 and Japanese Laid-Open Patent Publication No. 61-130904, it is considered that the benzylmethacrylate having the higher reactivity ratio is biased to the inside wall of the vessel and methylmethacrylate having the lower reactivity ratio is biased to the central portion to produce a concave type optical transmission medium in which the refractive index in the central portion is smaller than that of the inside wall portion. According to the experiments described below, however, exactly opposite results are obtained.

The above description referred to the case in which two kinds of monomers are used. The number of monomers, however, is not limited to two but more than two kinds of monomers can be used. When three kinds of monomers are used, each of them must meet the above conditions.

As far as no ill effect is produced in the transparency of the product polymer, optional additives such as radical polymerization initiator, antioxidant or else can be added.

For example, when the polymerization is caused to proceed in the radial direction of a cylindrical vessel, a transparent resin rod having radially graded refractive index can be obtained. This rod can be used as an optical transmission medium as it stands or by applying proper processing. For example, the obtained rod is drawn at an optional drawing ratio by a known method into fibers to produce optical transmission fibers made of a synthetic resin.

A cylindrical transmission medium having refractive index distribution of convex type, where the central portion is high in refractive index, is used for a bar lens and optical fiber for optical communication having the function of convex lens. A cylindrical transmission medium having refractive index distribution of concave type, where the central portion is low in refractive index, is used for a bar lens and optical transmission media having the function of concave lens.

When the reaction is carried out in a rectangular vessel, a plate lens having the function of convex lens or concave lens, is produced.

BEST MODE FOR CARRYING OUT THE INVENTION

The present invention will be described in more detail with reference to examples.

EXAMPLE 1

Methylmethacrylate (MMA) was put into a horizontally held glass tube and both ends of the tube were sealed up. Thermal polymerization was done with rotating the tube at 1000 rpm according to an ordinary method. A polymer tube of 10 mm in outer diameter and 6 mm in inner diameter composed of polymethylmethacrylate (PMMA) of 100,000 in molecular weight was prepared.

The outer glass tube was cracked and removed. MMA and benzylmethacrylate (BzMA) in the ratio by weight of 4:1 were filled into the horizontally held PMMA tube. After mercaptan and 0.50 wt. % of a polymerization initiating agent of benzoyl peroxide (BPO), thermal polymerization was done at 70° C. for 20 hours in the atmosphere. During the polymerization, the polymer tube was rotated at 1000 rpm.

After the polymerization, it was subjected to thermal treatment under a reduced pressure of 0.2 mm Hg at 80° C. for 20 hours. The content of monomer remaining in the produced polymer was measured, which was less than 0.5 wt. %.

The polymer tube and the polymer in the tube were integrally combined. Both end portions of this were cut off and it was thermally drawn with a cylindrical heating tube by indirect heating at 250° C. to obtain an optical fiber of 0.6 mm in diameter.

The distribution of refractive index in radial direction of the obtained optical fiber was measured by lateral interference method. The resultant data of distribution is shown in FIG. 1, which was even throughout the whole length of the fiber.

EXAMPLE 2

MMA and BzMA in a weight ratio of 4:1 were fed into a horizontally held glass tube and both ends of the tube were sealed up. Thermal polymerization was done with rotating the tube at 1000 rpm according to an ordinary method. A polymer tube of 10 mm in outer diameter and 6 mm in inner diameter composed of MMA/BzMA copolymer of 100,000 in molecular weight was prepared.

The outer glass tube was cracked and removed. MMA and BzMA in a weight ratio of 4:1 were filled into a horizontally held copolymer tube. Polymerization was carried out in the like manner as in Example 1 with rotation. The content of monomer remaining in the produced polymer was less than 0.5 wt. %.

By treating in the like manner as in Example 1, an optical fiber of 0.6 mm in diameter was obtained.

Figure 2:
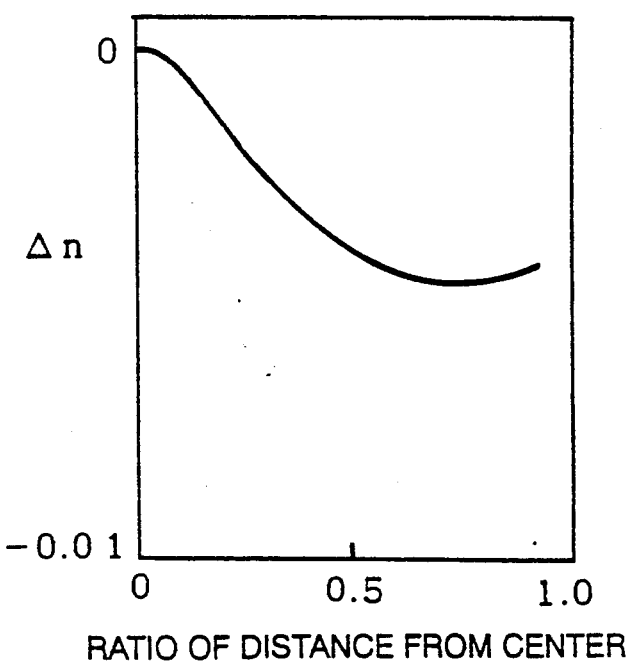
FIG. 2 shows distribution of refractive index in the direction of radius of an optical fiber, which is prepared in Example 1 and Example 2, respectively. In both the figures, the axis of ordinate indicates the differences ($\Delta n$) between the highest refractive index and refractive indexes at specific distances.

The distribution of refractive index in radial direction of the obtained optical fiber was measured by lateral interference method. The resultant distribution is shown in FIG. 2 which was even throughout the whole length of the fiber.

EXAMPLE 3

An optical fiber of 0.6 mm in diameter was made in the like manner as in Example 1 except that phenylmethacrylate (PhMA) was used in place of BzMA.

The measurement was done with regard to the obtained optical fiber, as a result, it was understood that the distribution of refractive index was similar to that shown in FIG. 1.

EXAMPLE 4

MMA and BzMA in weight ratios of 3:1, 4:1 and 5:1 were fed into three PMMA tubes obtained in the like manner as in Example 1, respectively. After adding 0.15 wt. % of a chain transfer agent of n-butylmercaptan and 0.50 wt. % of a polymerization initiating agent of an organic peroxide (trademark: PERHEXA 3M (made by Nippon Oils And Fats Co., Ltd.)), thermal polymerization was done at 90° C. for 20 hours in the atmosphere. During the polymerization, the polymer tube was rotated at 1000 rpm.

After that, optical fibers of 0.6 mm in diameter, respectively, were obtained by thermal drawing in the like manner as in Example 1.

The distributions of refractive indexes of the three optical fibers were measured. The differences of refractive indexes between central portions and peripheral portions were 0.017, 0.014 and 0.012, respectively, at maximum and the refractive indexes varied continuously.

EXAMPLE 5

Optical fibers of 0.6 mm in diameter were made in the like manner as in Example 1 except that p-chlorobenzylmethacrylate (CBzMA), 1-naphthylmethacrylate (NMA) and p-bromobenzylmethacrylate (BBzMA) were used in place of BzMA. The measurement was done with regard to the obtained optical fibers, as a result, it was understood that all had the distribution of refractive indexes of convex type similar to that of FIG. 1.

EXAMPLE 6

An optical fiber of 0.6 mm in diameter was made in the like manner as in Example 2 except that PhMA was used in place of BzMA. The measurement was done with regard to the obtained optical fiber, as a result, it was understood that the distribution of refractive index was similar to that shown in FIG. 2.

INDUSTRIAL APPLICABILITY

According to the present invention, the defects of phase separation and clouding due to the formation of homopolymer, the problem of remaining monomers due to the large difference in polymerization rates and the necessity of a long time for the completion of reaction in the use of monomers which are not good in monomer copolymerizability in the conventional art, were eliminated. Thus a large improvement was obtained in that a desirable optical transmission medium having refractive index gradient of multimode graded index (GI) type such as optical fiber and optical lens, is produced.

Furthermore, because the material is made of a thermoplastic resin, the drawing as post-forming process is possible, thereby readily providing fibers of a desired configuration.

As described in the above examples, when a liquid mixture of benzylmethacrylate and methylmethacrylate or phenylmethacrylate and methylmethacrylate is polymerized from the side of wall surface of a cylindrical vessel, benzylmethacrylate or phenylmethacrylate is densely distributed in the central portion and methylmethacrylate is densely distributed on the side of inner wall and a convex type optical transmission medium can be obtained, in which the refractive index in the central portion is higher than that in the portion near the inside wall.

The monomer reactivity ratios r of methylmethacrylate and benzylmethacrylate are 0.93 and 1.05, respectively. These values r of methylmethacrylate and phenylmethacrylate are 0.56 and 1.72, respectively. Therefore, in accordance with the methods disclosed in the foregoing Japanese Patent Publication No. 54-30301 and Japanese Laid-Open Patent Publication No. 61-130904, it is considered that benzylmethacrylate or phenylmethacrylate is densely distributed on the side of inner wall and methylmethacrylate is densely distributed in the central portion to produce a concave type optical transmission medium in which the refractive index in the central portion is smaller than that of the inner wall portion. Therefore, this means that the present invention cannot be made by the analogy of the disclosure in the above patent gazettes.

We claim:

1. A method of manufacturing a plastics-made graded index type optical transmission medium having a distribution of refractive index varying continuously in the direction of progress of polymerization comprising the steps of:
   feeding at least two radically copolymerizable monomers into a reaction vessel whereby a liquid mixture is formed, said monomers separately polymerizable into homopolymers having refractive indexes which differ from each other by at least 0.005;
   subjecting said monomers to radical polymerization initiated at an optional position in said reaction vessel whereby said monomers are polymerized through a gel condition into a polymer;
   polymerizing said monomers wherein the ratio of the concentration of unreacted monomer in the gel to the concentration of unreacted monomer in the liquid reaction mixture differs from the corresponding ratios of the other monomers fed into the reaction vessel; and
   lowering the monomeric concentration of the monomer having the highest ratio of unreacted monomer concentration in the gel to unreacted monomer concentration in the liquid mixture, in the direction of progress of polymerization.

2. The method as claimed in claim 1, wherein the monomer reactivity ratio r of any of said radical copolymerizable monomers is not lower than 0.2.

3. The method as claimed in claim 2, wherein the monomer reactivity ratio r of any of said radical copolymerizable monomers is not lower than 0.5.

4. The method as claimed in claim 2, wherein said polymerization is caused to proceed from the wall surface of the vessel to the inside of the vessel.

5. The method as claimed in claim 1, wherein said monomer liquid mixture contains at least methylmethacrylate and benzylmethacrylate.

* * * * *

UNITED STATES PATENT AND TRADEMARK OFFICE
CERTIFICATE OF CORRECTION

PATENT NO. : 5,253,323
DATED : October 12, 1993
INVENTOR(S) : Yasuhiro Koike, et al.

It is certified that error appears in the above-indentified patent and that said Letters Patent is hereby corrected as shown below:

Column 9, line 67: after "After" insert --adding 0.15 wt. % of a chain transfer agent of n-butyl- --

Signed and Sealed this

Twenty-eighth Day of June, 1994

*Attest:*

BRUCE LEHMAN

*Attesting Officer*     Commissioner of Patents and Trademarks